US012811795B2

(12) United States Patent
Natanzon et al.

(10) Patent No.: US 12,811,795 B2
(45) Date of Patent: Nov. 24, 2026

(54) TECHNIQUES FOR SEMANTIC VARIABLE-LENGTH DEDUPLICATION IN DATABASES

(71) Applicant: Eon IO, Ltd., Tel Aviv (IL)

(72) Inventors: Assaf Natanzon, Tel Aviv (IL); Yaniv Ptashnik, Tel Mond (IL); Dmitry Kuznetsov, Tel Aviv Yafo (IL); Ofir Ehrlich, Tel Aviv (IL); Ron Kimchi, Tel Aviv (IL); Haim Ben-Shimol, Kfar Saba (IL)

(73) Assignee: Eon IO, Ltd., Tel Aviv (IL)

( * ) Notice: Subject to any disclaimer, the term of this patent is extended or adjusted under 35 U.S.C. 154(b) by 33 days.

(21) Appl. No.: 18/940,450

(22) Filed: Nov. 7, 2024

(65) Prior Publication Data

US 2026/0128901 A1 May 7, 2026

(51) Int. Cl.
*H04L 9/32* (2006.01)

(52) U.S. Cl.
CPC .................................. *H04L 9/3236* (2013.01)

(58) Field of Classification Search
CPC ..................................................... H04L 9/3236
See application file for complete search history.

(56) References Cited

U.S. PATENT DOCUMENTS

| | | | | |
|---|---|---|---|---|
| 8,280,859 | B2 | 10/2012 | Anglin et al. | |
| 8,290,915 | B2 | 10/2012 | Anglin | |
| 8,745,003 | B1 | 6/2014 | Patterson | |
| 10,162,555 | B2 | 12/2018 | Kandamuthan | |
| 2006/0080427 | A1* | 4/2006 | Yach | H04W 99/00 709/224 |
| 2006/0259525 | A1* | 11/2006 | Bae | G06F 11/1658 |
| 2008/0201390 | A1 | 8/2008 | Anguelov | |
| 2010/0299311 | A1* | 11/2010 | Anglin | G06F 16/1756 707/E17.007 |
| 2014/0188805 | A1* | 7/2014 | Vijayan | G06F 16/113 707/646 |
| 2026/0010523 | A1* | 1/2026 | Xu | G06F 16/219 |
| 2026/0064274 | A1* | 3/2026 | Jose Mannanal | G06F 3/061 |

* cited by examiner

*Primary Examiner* — Sangseok Park
(74) *Attorney, Agent, or Firm* — M&B IP Analysts, LLC

(57) ABSTRACT

A system and method for the device may include reading a plurality of rows of a database. In addition, the device may include generating a secondary hash value for each row of the plurality of rows. The device may include generating a plurality of row groups, each including a group of unique rows of the plurality of rows, based at least on the secondary hash value. Moreover, the device may include generating a primary hash value for each row group of the plurality of row groups. Also, the device may include updating a backup of the database based on a first-row group of the plurality of row groups, in response to determining that a primary hash value of the first-row group does not match any primary hash value associated with the backup of the database.

11 Claims, 8 Drawing Sheets

| Row ID | Name | Last Name | Weak Hash |
|---|---|---|---|
| 1 | John | Doe | 5d41402a |
| 2 | Jane | Smith | 7d793037 |
| 3 | Alice | Johnson | 9b74c989 |
| 4 | Bob | Brown | 6dcd4ce2 |
| 5 | Charlie | Davis | 8f14e45f |
| 6 | Diana | Miller | 1a1dc91c |
| 7 | David | Wilson | 4a8a08f0 |
| 8 | Eve | Moore | 8277e091 |
| 9 | Frank | Taylor | 3c59dc04 |
| 10 | Grace | Anderson | 98f13708 |
| 11 | Henry | Thomas | 45c48cce |

610

620

FIGURE 6

| Row ID | Name | Last Name | Weak Hash |
|---|---|---|---|
| 1 | John | Doe | 5d41402a |
| 2 | Jane | Smith | 7d793037 |
| 3 | Alice | Johnson | 9b74c989 |
| 4 | Bob | Brown | 6dcd4ce2 |
| 5 | Charlie | Davis | 8f14e45f |
| 6 | Diana | White | 2b58c8e6 |
| 7 | David | Wilson | 4a8a08f0 |
| 8 | Eve | Moore | 8277e091 |
| 9 | Frank | Taylor | 3c59dc04 |
| 10 | Grace | Anderson | 98f13708 |
| 11 | Henry | Thomas | 45c48cce |

610 605 625

FIGURE 7

TECHNIQUES FOR SEMANTIC VARIABLE-LENGTH DEDUPLICATION IN DATABASES

TECHNICAL FIELD

The present disclosure relates generally to databases, and specifically to deduplication in databases for backup purposes.

BACKGROUND

Database backup is the process of creating copies of data to protect against data loss, corruption, or hardware failure. Backups ensure that information can be restored if something goes wrong, maintaining data availability and minimizing downtime. There are several types of backups used to meet different recovery needs. A full backup captures the entire database, offering a complete snapshot at a specific point in time. Incremental backups, on the other hand, store only the changes made since the last backup, making them more space-efficient but requiring all previous backups for a full restore. Differential backups store changes made since the last full backup, striking a balance between efficiency and ease of recovery.

Backup strategies play a critical role in deciding how often backups are taken and where they are stored. A common approach is the 3-2-1 strategy, which involves keeping three copies of data: the original plus two backups, with one stored offsite. In production environments, backups may occur at varying intervals—such as daily or weekly—depending on the organization's tolerance for data loss and downtime, often referred to as the Recovery Point Objective (RPO) and Recovery Time Objective (RTO). For high-demand systems, continuous or near-real-time backups, known as transaction log backups, are used to ensure minimal data loss. Additionally, automated backups in the cloud have become increasingly popular, offering scalability and offsite storage by default, which simplifies disaster recovery processes.

However, there are challenges specific to cloud-based backups. One significant issue is latency, where the time taken to transfer large amounts of data to and from the cloud can hinder backup and restoration speed. This can be particularly problematic for large databases that need quick recovery.

To overcome this, some solutions allow fast restoration of a database by doing an instance mount of the database and then querying the mounted database. While such a solution allows a user to access some content of the database, this still typically takes a significant amount of time. Further complicating this, if an incorrect version of the database is restored, a correction can be a long and error-prone process.

In addition, cloud-based databases can be implemented as managed databases, such as Amazon® RDS, or by deploying a virtual machine, such as an Amazon® EC2 instance with a database application installed thereon. Such a machine can include many temporary files which occupy a large amount of storage space. Additionally, an older database backup may utilize a previous version of the database application, such that when it is restored might cause a cybersecurity risk, as an outdated application.

Differential database backups present their own challenges, in attempting to discover what constitutes a differential change, how those are detected, and then how to update a backup based on such a detected change.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation cause(s) the system to perform the actions. One or more computer programs can be configured to perform particular operations or actions by virtue of including instructions that, when executed by a data processing apparatus, cause the apparatus to perform the actions.

In one general aspect, the method may include reading a plurality of rows of a database. Method may also include generating a secondary hash value for each row of the plurality of rows. Method may furthermore include generating a plurality of row groups, each including a group of unique rows of the plurality of rows, based at least on the secondary hash value. Method may in addition include generating a primary hash value for each row group of the plurality of row groups. Method may moreover include updating a backup of the database based on a first-row group of the plurality of row groups, in response to determining that a primary hash value of the first-row group does not match any primary hash value associated with the backup of the database. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: read a plurality of rows of a database; generate a secondary hash value for each row of the plurality of rows; generate a plurality of row groups, each including a group of unique rows of the plurality of rows, based at least on the secondary hash value; generate a primary hash value for each row group of the plurality of row groups; update a backup of the database based on a first-row group of the plurality of row groups, in response to determining that a primary hash value of the first-row group does not match any primary hash value associated with the backup of the database. Other embodiments of this aspect include corresponding computer systems, apparatus, and computer programs recorded on one or more computer storage devices, each configured to perform the actions of the methods.

In one general aspect, the system may include one or more processors configured to. System may also include reading a plurality of rows of a database. System may furthermore include generating a secondary hash value for each row of the plurality of rows. System may in addition generate a plurality of row groups, each including a group of unique rows of the plurality of rows, based at least on the secondary hash value. System may moreover include generating a primary hash value for each row group of the plurality of row groups. System may also include updating a backup of the database based on a first-row group of the plurality of row groups, in response to determining that a primary hash value of the first-row group does not match any primary hash value associated with the backup of the database. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an example database table of rows at a first backup, utilized to describe an embodiment.

FIG. 7 is an example database table of rows at a second backup, utilized to describe another embodiment.

DETAILED DESCRIPTION

Figure 1:
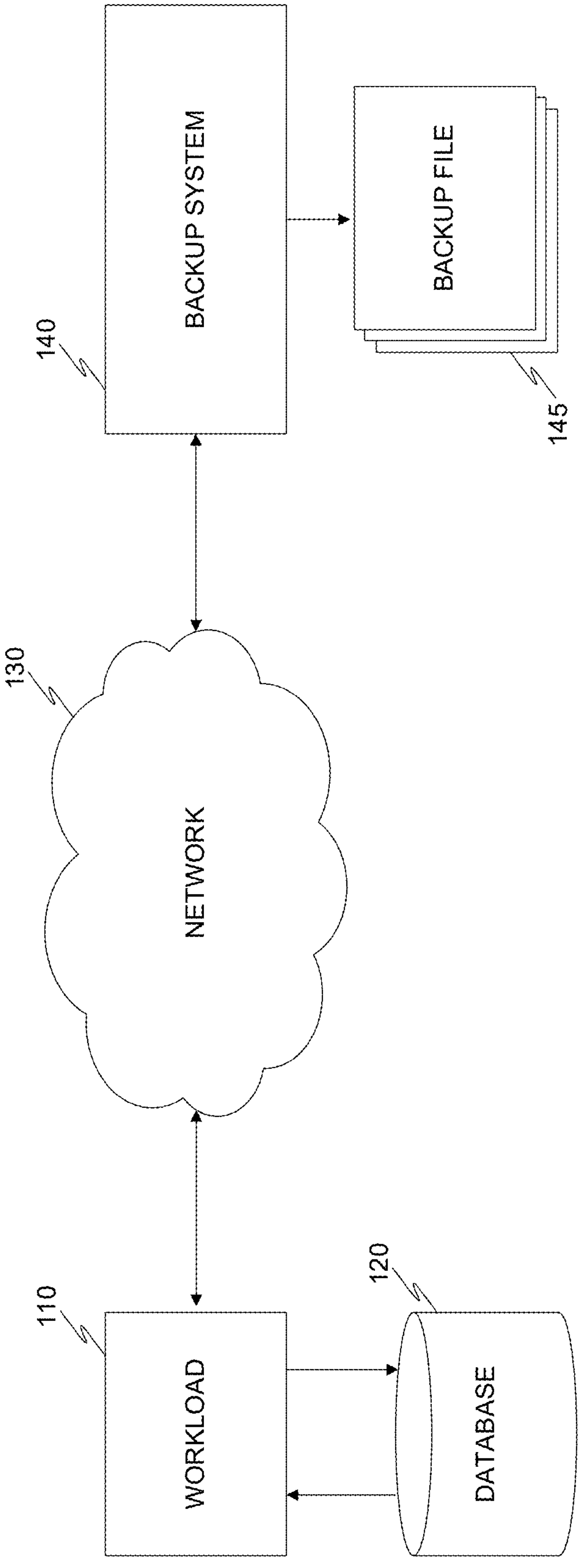
FIG. 1 is an example network diagram including a database backup system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram including a database backup system, utilized to describe an embodiment. In an embodiment, a database 120 includes a database application, a database management system (DBMS), a combination thereof, and the like. In some embodiments, the database 120 is a column-oriented database. In an embodiment, the database 120 is a relational database, a tabular relational database, and the like. For example, in an embodiment, the database 120 is implemented using SQL, MySQL, and the like query languages. In an embodiment, the database 120 includes metadata, such as a database schema. In some embodiments, the database schema includes a data structure, such as a table, including a plurality of keys, at least a portion of which correspond to columns of the table.

In certain embodiments, the database 120 is deployed on a workload 110. In an embodiment, the workload 110 is a physical computing device, a virtual computing device (e.g., a virtual machine), a combination thereof, and the like.

According to an embodiment, the workload 110 is implemented as a virtual machine, a software container, a serverless function, a combination thereof, and the like. In some embodiments, the database 120 is implemented as a managed database, for example utilizing Amazon® RDS. In an embodiment, a virtual machine is deployed as an Amazon® EC2 instance. A software container is deployed, according to an embodiment, on a container platform such as Kubernetes®, Docker®, and the like. In some embodiments, a serverless function is deployed as an Amazon® Lambda function.

In an embodiment, the workload 110 is configured to provide access to the database 120, for example over a network 130. In some embodiments, a cloud computing infrastructure is implemented on the network 130. For example, in an embodiment, a cloud computing infrastructure is Amazon® Web Services (AWS), Google® Cloud Platform (GCP), Microsoft® Azure, and the like. In certain embodiments, the cloud computing infrastructure is utilized to deploy a cloud computing environment. In an embodiment, a cloud computing environment is a virtual private cloud (VPC), a virtual network (VNet), a virtual private network (VPN), a combination thereof, and the like.

In some embodiments, the workload 110 is configured to provide access to the database 120 to a database backup system 140 (also referred to as backup system 140). In an embodiment, the backup system 140 is configured to generate a backup of the database 120. In an embodiment, the database system 140 is implemented as a virtual machine, a software container, a serverless function, a combination thereof, and the like.

In an embodiment, the backup system 140 is configured to generate a backup of a database by determining a primary key of the database 120. In some embodiments, the database backup includes a data backup and a machine backup. For example, according to an embodiment, the data backup includes only data from the database. In some embodiments, only data of the database includes data exported from the database, a database schema, a combination thereof, and the like.

In an embodiment, the machine backup includes data, information, and the like, which allows to generation of a restored machine (i.e., a restored virtualization) which is configured to host a database application capable of exposing the data restored from the data backup. In an embodiment, the machine is a virtualization instance such as a virtual machine, a software container, a serverless function, a combination thereof, and the like.

According to an embodiment, data, information, and the like that allow for the generation of a restored machine include a filesystem, a directory, a registry, configuration information, software product keys, a combination thereof, and the like. For example, according to an embodiment, machine backup includes an identifier of an operating system (such as Windows®, Linux®, etc.), an identifier of a database application (e.g., Apache® Derby), a filesystem, a registry file, a configuration file, a combination thereof, and the like.

In some embodiments, generating a machine backup is performed by mounting the file system of a virtual machine that hosts the database application, and generating a file-level backup that omits log files, table files, and the like data files of the database application. For example, in an embodiment, a file-level backup includes generating a storage-based snapshot of the virtual machine, i.e., a snapshot of at least a block device attached to the virtual machine, mounting the snapshot to a second virtual machine, and exporting data from the second virtual machine into a data backup. In an embodiment, exporting data includes executing a plurality of queries on a database application of the second virtual machine, where each query returns a plurality of rows of data from the database. Such data exportation from a database is discussed in more detail with respect to FIG. 3 below.

In an embodiment, generating a machine backup includes generating a block-level backup of a virtual machine on which the database application is deployed. In some embodiments, data blocks which include data from the database are released, so that they are not stored as part of the machine backup. This ensures that a block-level backup of the machine only is generated, without any of the data of the database application, the latter stored separately as a database data backup.

According to an embodiment, at least a file that includes database data is zeroed out, punched out, etc., prior to generating a machine backup (i.e., a backup of a state of the virtual machine without any of the data of the database). In some embodiments, it is advantageous to drop a table from a database application on a restored virtual machine prior to inserting the backed-up data. In an embodiment, dropping a table from a database application includes erasing all records (i.e., all data rows), deleting indexes, triggering permissions, etc., breaking foreign key constraints, releasing storage space assigned to the table, a combination thereof, and the like. In some embodiments, metadata of the database application is stored as part of the machine backup. In an embodiment, metadata includes a store procedure, a view, a schema, a combination thereof, and the like.

In certain embodiments, generating a machine backup includes detecting software applications deployed, executed, etc., on the workload 110 and storing a product key for each detected application. For example, in an embodiment, Apache® Derby is detected on the workload 110, and a product key for Derby is stored as a portion of the machine backup.

In an embodiment, when restoring the machine (e.g., the workload 110) from the machine backup, the product key is accessed, and a new installation of Apache® Derby is deployed on the restored machine. In an embodiment, restoring a machine includes configuring an orchestrator of a cloud computing environment to deploy a virtual machine (e.g., an Amazon® EC2) in a cloud computing environment.

In certain embodiments, storing such product keys is advantageous as it allows for generating a machine with software applications that are up to date. This in turn reduces the risk of a cybersecurity breach due to vulnerable versions of software that can be deployed from a more straightforward database backup. This is a clear advantage of creating separate backups for the database data and the database software application (i.e., the machine backup).

In some embodiments, detecting a product key includes scanning a virtual machine, a disk of the virtual machine, and the like, to detect thereon a stored product key. In some embodiments, a product key is detected by accessing a registry of a machine, workload, virtual instance, and the like, and reading therefrom a product key, a plurality of product keys, and the like. In some embodiments, the product key is associated with an identifier of a software application. In certain embodiments, a software repository is determined, from which a software application can be downloaded, installed, etc., on a virtualization, based on the product key. For example, in some embodiments, an orchestrator is provided with a product key when instructed to deploy a virtualization, and a software application is selected from a software repository accessible to the orchestrator.

In some embodiments, the backup system 140 is configured to generate a restored database. In an embodiment, the backup system 140 is configured to restore a machine backup into an operational machine (e.g., a virtual machine deployed in a cloud computing environment) and is further configured to restore database data into the restored (i.e., operational) machine, for example by utilizing the methods described in more detail herein, which results in a restored database.

In an embodiment, the backup system 140 is configured to generate a data backup based on the data stored in database 120. In certain embodiments, the data backup includes a plurality of backup files 145. In an embodiment, the backup files 145 are a plurality of data files, stored each as a column-oriented data file. A column-oriented data file is, for example, Apache® Parquet. In an embodiment, values of each column of the database are stored in serial, contiguous, and the like, memory locations, which allows several benefits, such as improved column-wise compression and reduced query execution processing by reading only the column and not an entire row of data, where the contents of the row may not be relevant to the query.

In an embodiment, the backup system 140 is configured to determine a primary key of the database. In some embodiments, the backup system 140 is configured to generate a plurality of queries based on the primary key, each query returning a plurality of rows of data from the database. In an embodiment, the plurality of rows are stored as at least a column-oriented data file, e.g., the backup files 145.

According to an embodiment, a primary key is a database key that includes values that are unique for each row. For example, a primary key is, in an embodiment, an index value. As no two rows can have the same index value, an index value can be used as a primary key. In some embodiments, a primary key is a composite key, i.e., a combination of a key value of a first column and a key value of a second column, which together form a unique value.

Figure 2:
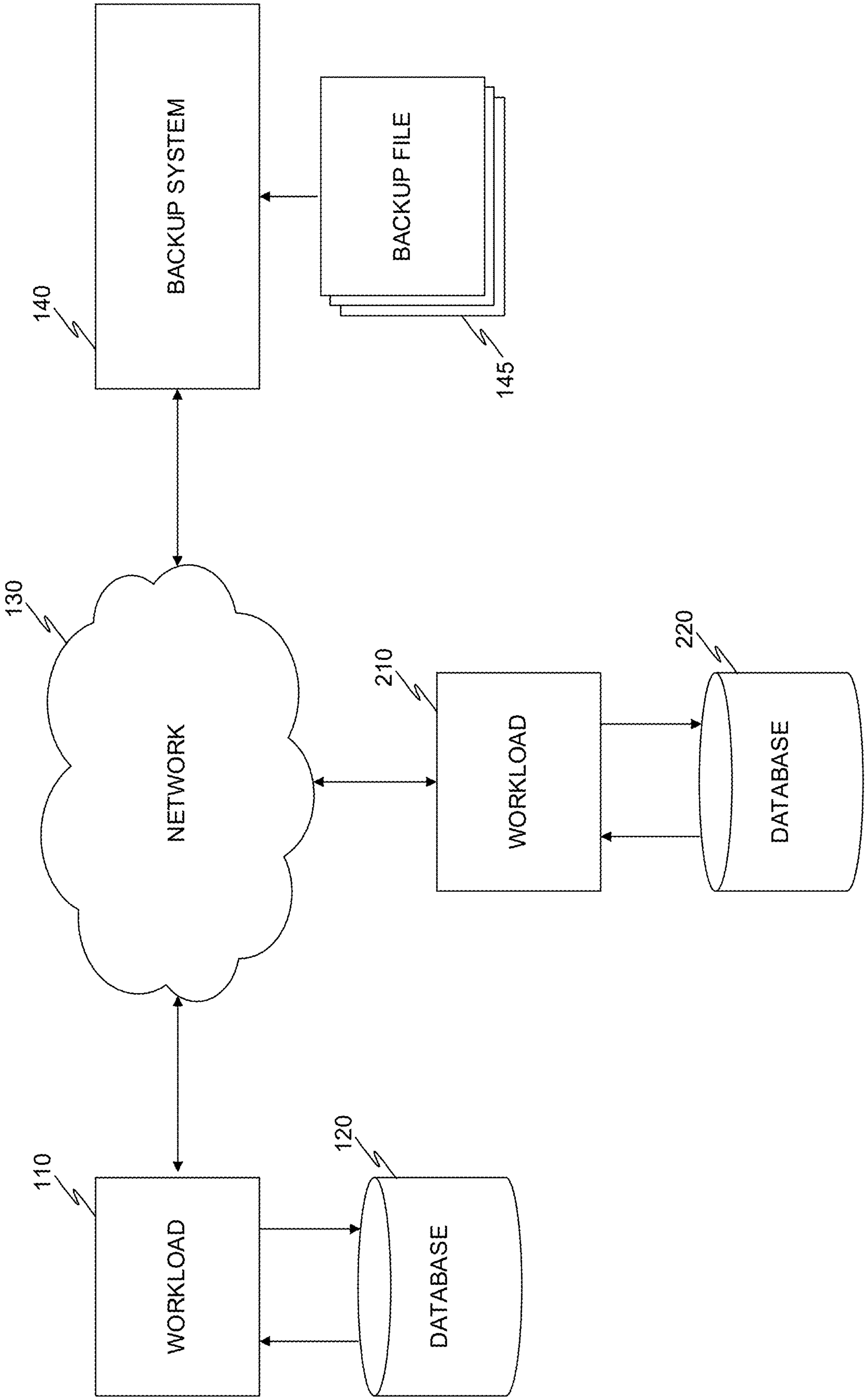
FIG. 2 is an example network diagram of a backup system performing a database restoration, utilized to describe an embodiment.

FIG. 2 is an example network diagram of a backup system performing a database restoration, utilized to describe an embodiment. According to an embodiment, a backup system 140 is configured to receive a request to restore a database application, including the database data thereof.

In an embodiment, the backup system 140 is configured to instruct an orchestrator (not shown), other provisioning device, and the like, to deploy a restored workload 210, which corresponds to the workload 110. For example, in an embodiment, the restored workload is deployed from an auto-scaling group (ASG) which is deployed in a VPC of a cloud computing environment.

In some embodiments, the backup system 140 is configured to restore the restored workload 210 based on a file-level backup, a block-level backup, a plurality of software keys, and the like. For example, in an embodiment, the backup system 140 is configured to generate, provision, etc., an empty bootable machine volume. In an embodiment, a bootable machine volume is implemented utilizing Amazon® Elastic Block Storage (EBS).

In some embodiments, data of the backup files 145 is copied into the database 220. In certain embodiments, the workload 210 is configured to query the backup files 145 while the data of the backup files 145 is being written, copied, etc., to the database 220. This allows access to the data while performing the restoration.

For example, according to an embodiment, a database application of the database 220 is configured to receive a query for execution thereon. In an embodiment, the database application is configured to execute the query on the backup data files 145 in response to determining that the backup data files 145 have not yet been completely written to the database 220.

Figure 3:
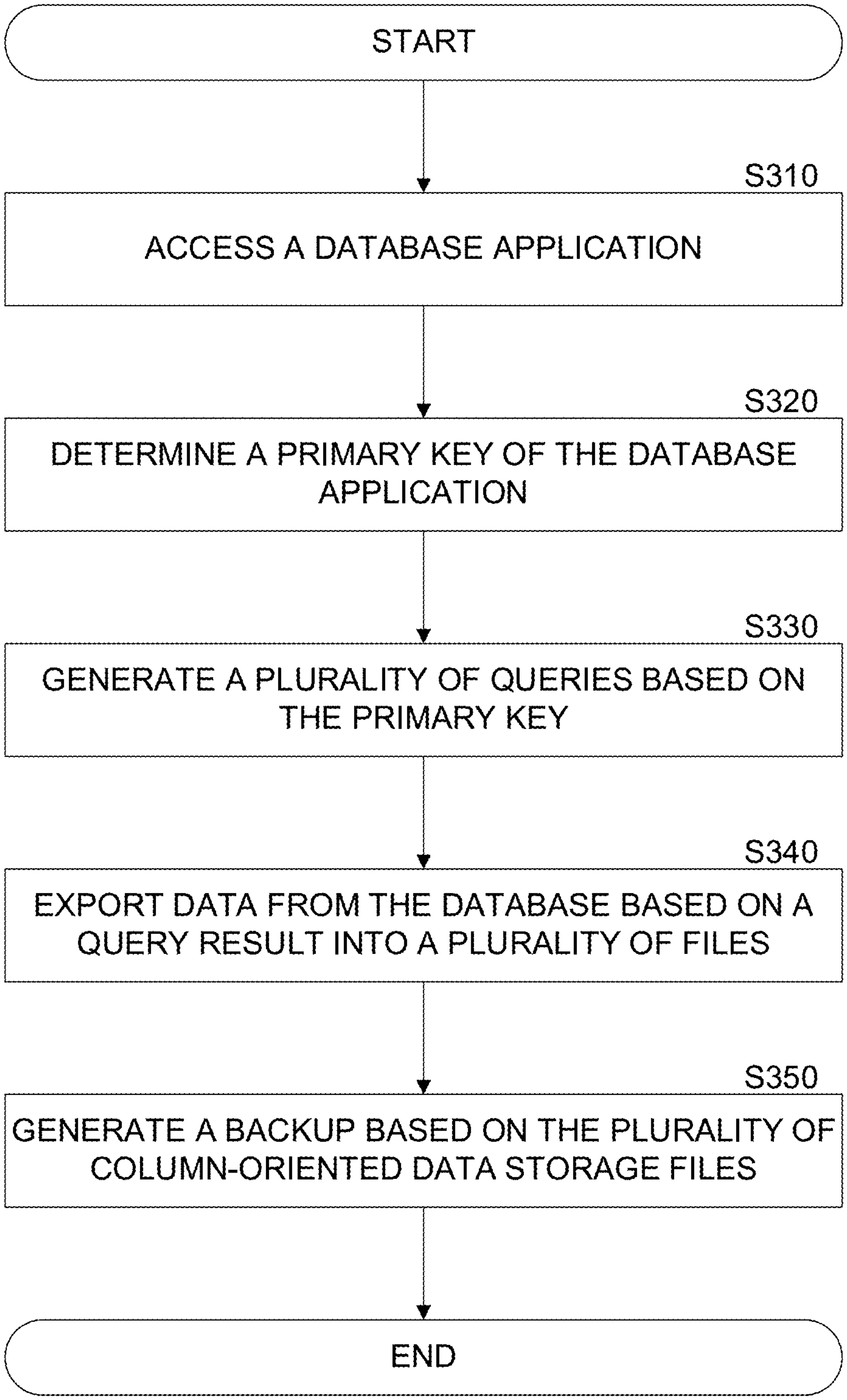
FIG. 3 is an example flowchart of a method for generating a database backup, implemented in accordance with an embodiment.

FIG. 3 is an example flowchart of a method for generating a database backup, implemented in accordance with an embodiment. The method may be performed by the backup system 140. In an embodiment, generating a database backup includes generating a backup of the machine hosting the database (which omits the data of the database) and generating a backup of the data of the database as two distinct backups.

At S310, a database application is accessed. In an embodiment, accessing a database application includes detecting a database application deployed in a computing environment, such as a cloud computing environment. According to some embodiments, accessing a database application includes receiving a token, a credential, a combination thereof, and the like, to access the database. In an embodiment, accessing the database application includes accessing a machine, a workload, and the like, on which the database application is deployed.

According to certain embodiments, the database application is a stand-alone database application deployed on a virtual machine. In an embodiment, a stand-alone database application is, for example, PostgreSQL, SQLite, MySQL, Oracle® Database, and the like.

At S320, a primary key of the database is determined. In an embodiment, the primary key is overridden, for example by a user input. In some embodiments, the primary key is an index of rows, for example. In an embodiment, the primary key includes a value assigned to each row, which is a unique value, such that no two rows include the same value of the primary key.

In some embodiments, a primary key is generated based on a composite of multiple-column identifiers. For example, in an embodiment, two identifiers, each of a distinct column, form together a primary key. In certain embodiments, a plurality of primary keys are selected, each primary key corresponding to a table of the database.

At S330, data is exported from the database. In an embodiment, exporting data from the database includes generating a plurality of queries. In an embodiment, a plurality of queries are generated, each based on a value range of the primary key. For example, in an embodiment, a first query of the plurality of queries is generated based on a value range of '0' to '10,000' of the primary key, and a second query of the plurality of queries is generated based on a value range of '10,001' to '20,000'. In an embodiment, there is no overlap between the values of the primary key for each of the generated queries. In an embodiment, the query is generated in a query language, such as SQL.

In an embodiment, data is exported from the database utilizing a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, a logical backup is a consistent snapshot, as opposed to a physical backup, which includes, for example, configuration files, raw files, directories, etc.

At S340, a plurality of files are generated. In an embodiment, the plurality of files are generated in a column-oriented data format, such as Apache® Parquet. In some embodiments, the plurality of files are generated such that a file, a group of files, etc., corresponds to a result of executing a query of the plurality of queries. Thus, data is exported from the database into a plurality of data files.

In an embodiment, data is exported from the database application into the plurality of files by generating the plurality of queries, executing each query on the database, receiving a result for each query, and storing the results as a plurality of data files in a column-oriented data format.

In some embodiments, for example, where a logical backup is generated (e.g., utilizing pg_dump command), the plurality of files are generated by converting the logical backup into a plurality of column-oriented data format files.

At S350, a database data backup is generated. In an embodiment, the data backup is generated based on the plurality of data files. In some embodiments, the data backup includes a timestamp, a version identifier, and the like, which indicate a date, a time, a combination thereof, and the like, at which the data backup was generated. In an embodiment, the data backup is utilized in restoring a database.

In some embodiments, the data backup includes a data structure, such as metadata of the database, a data schema of the database, table data, a store procedure, a view, a combination thereof, and the like. In an embodiment, database data (e.g., schema, views, store procedures, etc.) are extracted from a dump, for example utilizing pg_dump, without storing the data itself. Thus, a pg_dump command can be utilized to generate the data files (e.g., Parquet files) and also to generate the machine backup, e.g., by extracting the metadata of the database, including views, store procedures, schema, etc.

It should be noted that a data backup is not the same as a storage backup. In a storage backup, a block-for-block copy of the storage device is created, which includes the database data and also includes a lot of data that is not useful for the actual database application, such as temporary files. It is therefore advantageous to store a backup only of the data of the database, without all the unnecessary files, folders, etc., which are not essential for the database to function properly.

In certain embodiments, a machine backup is generated, which includes data of the machine that is utilized to deploy the database application. Restoring a machine backup to a machine allows deployment of a machine that functions as the original machine, sans the data of the database. Once the data of the database application is written there, the restored machine is fully restored and functional.

In an embodiment, a machine backup is generated as a file-level backup, as a block-level backup, as a product key store, a combination thereof, and the like. The figures below discuss in more detail the generation of a machine backup utilizing various methods, and the restoration of a machine (e.g., restoring a virtualization instance) based on each such backup type.

In an embodiment, a machine backup includes data, information, and the like, which is utilized in restoring a machine. In some embodiments, restoring a machine includes generating a new machine according to the parameters of the original machine hosting the database.

Figure 4:
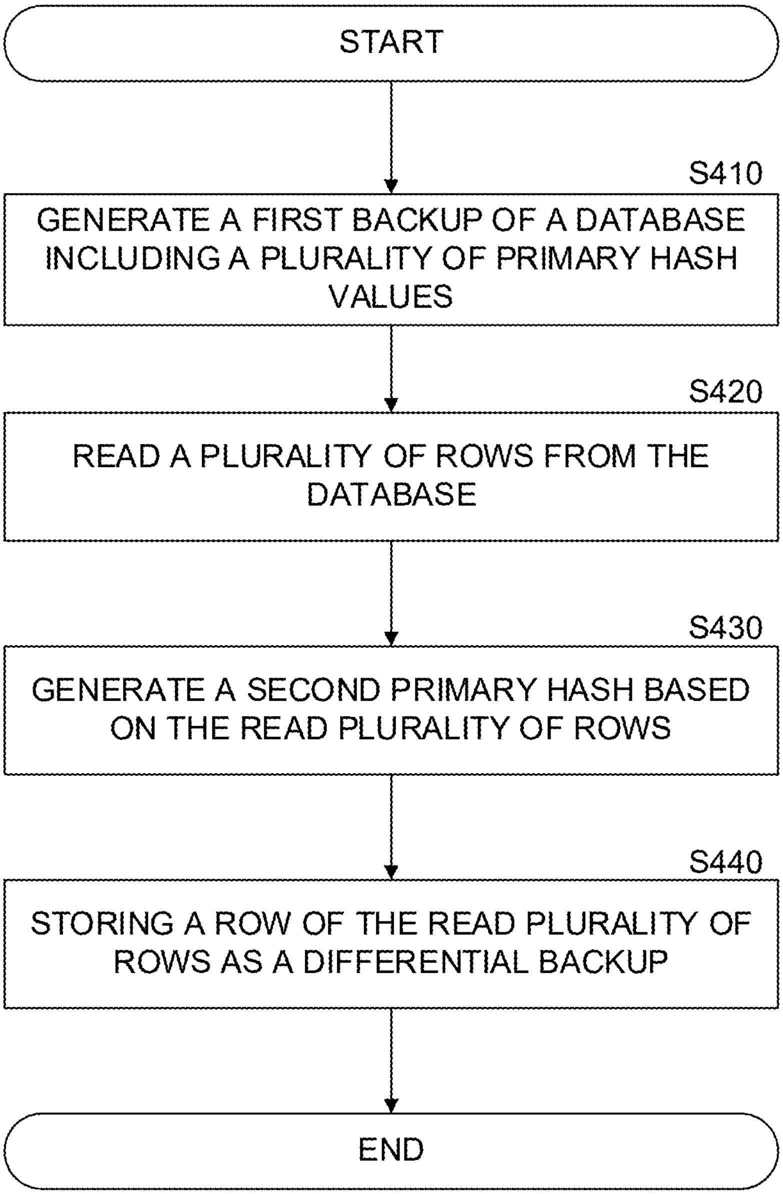
FIG. 4 is an example flowchart of a method for generating a differential backup that reduces deduplication, implemented in accordance with an embodiment.

FIG. 4 is an example flowchart of a method for generating a differential backup that reduces deduplication, implemented in accordance with an embodiment.

At S410, a first backup is generated. In an embodiment, the first backup is a data backup of data of a database application. According to an embodiment, the first backup is generated by reading a plurality of rows from a database. In an embodiment, the plurality of rows are read by generating a query for the database based on a primary key of the database. In an embodiment, the query is generated based on a value range of the primary key.

According to an embodiment, the first backup is generated as a logical backup. For example, in a PostgreSQL database, a pg_dump command is utilized to export data from a database application to a logical backup. According to an embodiment, a logical backup includes schema and data as query language (e.g., SQL) commands, binary format, and the like. In an embodiment, the logical backup is converted to a plurality of files, each file stored as a column-oriented data format file (e.g., a Parquet file).

In an embodiment, a secondary hash value is generated for each row of the plurality of rows. In some embodiments, the secondary hash value is generated based on a hash function which is computationally inexpensive, also known as a weak hash. A weak hash is prone to collisions, i.e., when two distinct values are mapped into a same hash value. In an embodiment, a secondary hash function is xxhash, MD5, and the like.

According to an embodiment, a secondary hash value is utilized in generating a plurality of a row group, which includes a group of rows of the plurality of rows. In an embodiment, a secondary hash value having a value that satisfies a predetermined condition is a cutoff point, such that a row of the plurality of data rows appearing in the database after the cutoff point is not part of the row group.

In an embodiment, a rolling hash value is generated. In some embodiments, the rolling hash value is utilized to determine a cutoff point. For example, in an embodiment, the rolling hash value is generated based on a plurality of secondary hash values.

In certain embodiments, a secondary hash value, a rolling hash value, a combination thereof, and the like, are utilized to determine content-defined chunking (CDC) to generate chunk boundaries on the plurality of rows, each chunk corresponding to a row group. In some embodiments, the rolling hash is generated based on a row (i.e., the contents thereof, a secondary hash thereof, a combination thereof, etc.), a plurality of rows, etc. In an embodiment, where the rolling hash is generated based on a plurality of rows, the number of rows on which the rolling hash is generated is constant.

In an embodiment, a primary hash value is determined for each row group. In some embodiments, the primary hash value is determined based on content from at least a row of the row group. In an embodiment, the primary hash value is determined based on content from each row of the row group. In certain embodiments, the primary hash value is based on all the content of all the rows, on a portion of the content of a portion of the rows, on a portion of the content of all of the rows, a combination thereof, and the like.

According to an embodiment, the primary hash is a cryptographic hash, a strong hash, and the like, which is less susceptible to a collision than the secondary hash. In an embodiment, the primary hash is SHA-1, SHA-256, and the like.

In some embodiments, the first backup includes a metadata, such as a manifest. In an embodiment, the manifest includes a plurality of primary hash values, each primary hash value generated based on at least a row of the database. In an embodiment, a manifest includes an identifier of a file, such as a column-oriented format file which includes thereon data of rows of a row group, of a plurality of row groups, and the like. In an embodiment, a pointer is stored in a location of the hash value. In some embodiments, a primary key of the database, a primary key of the group, etc., is stored and associated with the database.

In certain embodiments, a backup includes a plurality of manifests, a manifest with timestamps corresponding to a backup time, a combination thereof, and the like. In an embodiment, different manifests, a manifest with timestamps, etc., allow the restoration of the database data to different points in time.

In an embodiment, a number of rows of the first plurality of rows is determined. In some embodiments, the number corresponds to a value range of the queries. According to an embodiment, it is advantageous to determine an average size of row groups, to ensure low metadata overhead while also providing deduplication (e.g., not storing duplicates of the same data). In an embodiment, this is performed by determining the number of rows of a database, determining the size of the database data on a storage device, and dividing the size of the database by the number of rows to determine an average row size. This in turn allows to determine the average size of a group of rows.

In an embodiment, a cutoff condition is determined based on the determined average size of a group of rows. For example, in an embodiment, an average row group size is determined to be 16 KB. In such an embodiment, a total size of the database is determined, and a total number of rows is likewise determined. The total size of the database divided by the number of rows yields an average size per row (e.g., 2 KB). In an embodiment, a row group should include 8 rows on average, so that the average size of a row group corresponds to 16 KB. In an embodiment, the cutoff condition (e.g., a condition on the secondary hash, the rolling hash, etc.) is generated such that the average number of rows in a row group is 8 rows.

At S420, a second plurality of rows is read from the database. In an embodiment, the second plurality of rows is read based on the previously determined value range of the primary key.

In an embodiment, a second plurality of row groups is generated, utilizing the same conditions as described in more detail with respect to S410, based on the second plurality of rows.

In some embodiments, due to the cutoff conditions being the same, a row group includes the same rows in the group as the previous read, unless a content of a row is updated, a row is deleted, a row is inserted, or a combination thereof, and the like.

In an embodiment, the second plurality of rows is read from the database at a second time, which is after a first time at which the first backup of the database is generated. In some embodiments, a database is read (i.e., backup is initiated) periodically, for example, every 24 hours.

At S430, a second primary hash value is generated. In an embodiment, the second primary hash value is generated based on a row group of the second plurality of rows. For example, according to some embodiments, the second primary hash value is generated based on the content of a row group, a portion of the content of the row group, etc.

In an embodiment, the second primary hash value is generated utilizing the same methodology as the primary hash values of the first database. In some embodiments, the second primary hash value is compared to each primary hash value of the database backup.

At S440, at least a row of the row group is stored as a differential backup. In an embodiment, the row group is of the second plurality of rows. In some embodiments, the differential backup includes only a changed row (i.e., a row whose contents changed since the last backup) without including any other content from other rows in the row group. In an embodiment, the row is stored in response to determining that the value of the first primary hash is different than the value of the second primary hash.

In some embodiments, a second primary hash having a different value indicates a change of a row in a group of rows. This can be due to the insertion of a row, deletion of a row, alteration of a content of a row, a combination thereof, and the like. In an embodiment, in order to determine which change occurred, the files can be read from the backup to determine a state of the rows, the row group, etc., at a previous time.

However, reading is more computationally expensive, in some embodiments, than storing a row group. Therefore, in some embodiments, it is advantageous to store the row group without reading data from a previous backup and comparing such to determine what the change includes. In certain embodiments, the row group is therefore stored as the differential backup.

In some embodiments, a manifest associated with the database backup is updated based on the detected difference (i.e., the detected difference in primary hash values). In certain embodiments, the detected difference is detecting that a primary hash value does not appear in a manifest, and therefore represents at least a change in a row of the database.

In an embodiment, a row, a group of rows, etc., is read from the database backup. In an embodiment, the row, group of rows, etc., is read from the database to compare with a row, a row group, etc., which is read from the database, to detect a change in a row, row group, and the like.

For example, in an embodiment, a database includes 20 rows, merely for simplicity. Secondary hashes are determined for each row, and row groups are generated such that rows 1-5 correspond to a first group, rows 6-11 correspond to a second group, and rows 12-20 correspond to a third group. In an embodiment, a primary hash value is generated for each row group. The first database backup therefore includes the data of rows 1-20, stored as row groups, and the primary hash values corresponding to each row group. In an embodiment, a pointer to a hash value, a primary key value, etc., are stored and associated with the backup of the database, for example as metadata, a manifest, etc.

In some embodiments, a change in row 8 occurs after the first backup of the database is generated. At a second backup, the data of rows 1-20 is read again, and secondary hashes are again determined for each row. In an embodiment, the change in row 8 causes a change in the secondary hash value of row 8, which in turn changes the chunking of row groups. According to an embodiment, at the second backup, the row groups now consist of a first-row group of rows 1-5, a second-row group of rows 6-8, a third-row group of rows 9-11, and a fourth-row group of rows 12-20.

In an embodiment, a primary hash value is generated for each row group at the second database backup. Here, the primary hash value of rows 1-5 of the first backup and the primary hash value of rows 1-5 of the second backup correspond, so there is no need to store rows 1-5 of the second backup. The same holds for rows 12-20.

In this example, the primary hash value of rows 6-11 does not appear in the second database backup, due to there not being a row group of rows 6-11 in the second database backup. Furthermore, there are now two new row groups (row group 6-8 and row group 9-11) which each have a primary hash value that does not appear in the first backup.

In an embodiment, the new row groups are stored with the new primary hash values as the second database backup. Therefore, in an embodiment, when the database is restored to the first database row groups 1-5, 6-11, and 12-20 are read from the first database backup. However, when the restoration is to the second backup, then rows 1-5 are read from the first backup, rows 6-8 and 9-11 are read from the second backup, and rows 12-20 are read from the first backup.

Figure 5:
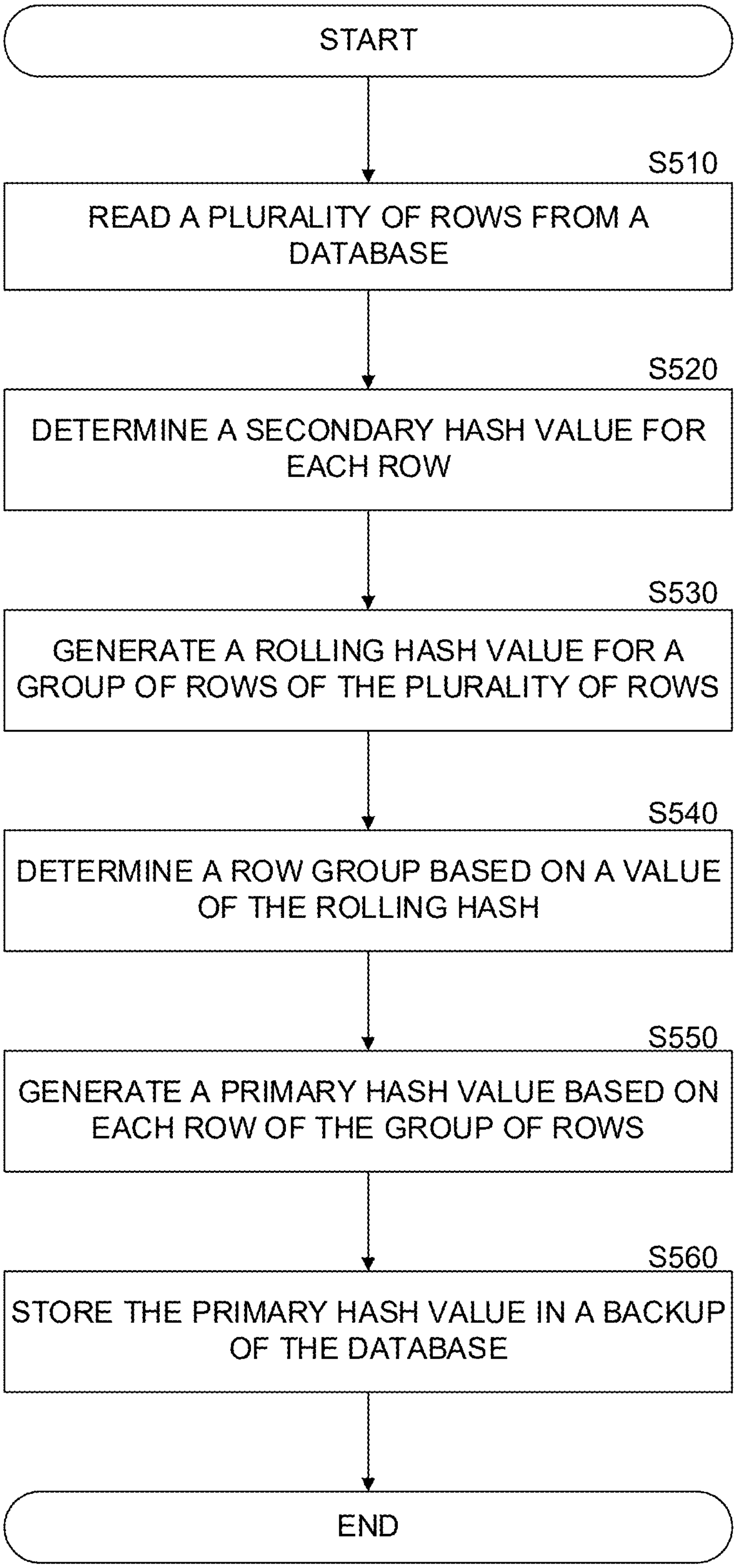
FIG. 5 is a flowchart of a method for determining a group size for reducing data deduplication in database backups, implemented according to an embodiment.

FIG. 5 is a flowchart of a method for reducing data deduplication in database backups, implemented according to an embodiment. In an embodiment, it is advantageous to determine an average size of row groups, to ensure low metadata overhead while also providing deduplication (e.g., not storing duplicates of the same data).

In an embodiment, the average storage size of a row is 2 KB, for example. In an embodiment, an average row size is determined based on the storage size of a database table on a disk, divided by the total number of rows. In an embodiment, the average size is susceptible to change, for example as a database grows larger. In some embodiments, the criteria for the average row size is maintained, unless the average row size changes by a factor of '2', for example. In an embodiment, a condition is set such that the average size of the group of rows is predetermined (e.g., at 2 KB).

For example, in an embodiment, an average row group size is determined to be 16 KB. In such an embodiment, a total size of the database is determined, and a total number of rows is likewise determined. The total size of the database divided by the number of rows yields an average size per row (e.g., 2 KB). In an embodiment, a row group should include 8 rows on average, so that the average size of a row group corresponds to 16 KB. In an embodiment, the cutoff condition (e.g., a condition on the secondary hash, the rolling hash, etc.) is generated such that the average number of rows in a row group is 8 rows.

At S510, a plurality of rows are read. In an embodiment, a plurality of rows are read from a database, for example by querying a database based on a primary key value range, such as discussed in more detail above.

In an embodiment, the plurality of rows is read to determine a plurality of row groups, wherein the average size of the row groups is determined based on a predetermined condition (e.g., a cutoff condition). For example, in an embodiment, the average size of a row group is determined based on a predetermined size, a predetermined size and value range (e.g., 16 KB), and the like.

At S520, a secondary hash value is determined for each row. In an embodiment, a weak hash is utilized as the first hash value. This is advantageous as a weak hash function, as explained above, requires less computational resources than a strong hash function, despite it being more susceptible to collision.

At S530, a rolling hash value is generated. In an embodiment, the rolling hash value is generated based on the secondary hash values of the current row and the preceding 'k' rows of secondary hash values, where 'k' is an integer having a value of '1' or greater.

In an embodiment, a cutoff condition is determined and checked against the value of the rolling hash value. For example, in an embodiment, the cutoff condition is based on the value of the weak hash such that the last 4 bits are equal to '0×02'. In some embodiments, the row that satisfies the cutoff condition is included in the current row group, while the next sequential row starts a next row group. In certain embodiments, the row that satisfies the cutoff condition is excluded from the current row group and starts the next row group.

At S540, a row group is determined. In an embodiment, the value of the rolling hash is utilized to determine the row group. For example, according to an embodiment, the row group includes a number of rows from a first row corresponding to a rolling hash value which satisfies the cutoff condition, to a second row corresponding to a rolling hash value which also satisfies the cutoff condition.

At S550, a primary hash value is generated. In an embodiment, a primary hash value is a strong hash that is generated based on the content of all the rows in the row group. In an embodiment, a weak hash is, for example, xxhash, MD5, and the like. Such hash functions are susceptible to collisions, i.e., when two inputs produce the same output.

In some embodiments, a strong hash by contrast is less susceptible to collisions than a weak hash, and as a consequence is more computationally costly to generate, therefore it is advantageous to generate less of this type of hash value. In an embodiment, a strong hash function is, for example, SHA-256, SHA-3, and the like.

At S560, the primary hash value is stored. In an embodiment, a plurality of primary hash values, each corresponding to a row group, is stored, for example in addition to a data backup of a database. In certain embodiments, the primary hash value is stored as a manifest of a database backup.

In some embodiments, the primary hash values are stored in a sequential order, such that a first primary hash value corresponds to a group of rows that come before a second group of rows in the database, where the second group of rows corresponds to a second primary hash value which is stored after the first primary hash value.

In an embodiment, a primary hash value is utilized in determining if a second backup of a database which is initiated after a first backup is performed, includes duplicated data. In some embodiments, the process is utilized on the second backup to detect row groups that are already stored in the first backup. For example, where a primary hash value of a row group of a first backup is identical to a primary hash value of a corresponding row group of the second backup, then such row groups are identical, and therefore there is no need to store the second-row group (of the second backup) as this data is already stored in a backup.

In certain embodiments, where the primary hash value does not match, the row group is accessed from the database backup, to determine which row, plurality of rows, etc., includes a change. However, in an embodiment, this is costly, and it is advantageous to store the new primary hash value and the new row group. In some embodiments, the new primary hash value is stored in a manifest with an indicator indicating a change at that point in time (e.g., for a current backup version, restoration point, etc.).

In an embodiment, the new row group is stored. In some embodiments, it is advantageous instead to store only the row group that has changed. In an embodiment where only changes, metadata respective of such changes is stored as part of the database backup.

FIG. 6 is an example database table of rows at a first backup, utilized to describe an embodiment. In an embodiment, a plurality of rows (here, 1 through 11) are read from a database table. In an embodiment, a plurality of weak hash values are generated for each row.

According to an embodiment, where the cutoff condition is a weak hash value that equals '0×02' a cutoff 610 is determined between rows 4 and 5, resulting in two-row groups. In an embodiment, a first-row group includes rows 1-4 and a second-row group includes rows 5-11.

In an embodiment, a weak hash value, such as weak hash value 620, is generated based on values of the corresponding row, i.e., row 6. In some embodiments, a strong hash value is generated based on the content of rows 1-4, and a second strong hash value is generated based on the content of rows 5-11.

FIG. 7 is an example database table of rows at a second backup, utilized to describe another embodiment. In an embodiment, a value of row six 605 has changed from the previous read (i.e., the database table of FIG. 6).

According to an embodiment, the strong hash value of the first-row group of FIG. 6 is equal to the strong hash value of the first-row group of FIG. 7, as none of the rows have changed.

However, for the strong hash values corresponding to the second group of rows, the values are no longer identical between FIGS. 6 and 7, due to the change in value 605 which changes the weak (secondary) hash value 625. Therefore, when the primary hash value is determined for rows 5-11 based on the content of these rows, the value of the primary hash value is different than the primary hash values which are generated based on the content of FIG. 6.

According to an embodiment, it is therefore advantageous to store a backup of the entire table of FIG. 6, and only of the row that changed in FIG. 7. This allows for reducing duplicated data storage, by storing only data that corresponds to a state of a database at a time which the backup was initiated.

In some embodiments, a first backup is generated based on the data of FIG. 6, and a second differential backup is generated based on storing row group 5-11 of FIG. 7. Thus, a first manifest of the backup would include the primary hash values of row groups 1-4 and 5-11 of FIG. 6, and the entire data contents thereof. A second manifest, according to an embodiment, includes a new primary hash value of rows 5-11 of FIG. 7 on top of the first manifest, indicating that the second-row group includes a change.

In an embodiment, when restoring the database, two restoration points are therefore available (to the state presented in FIG. 6 and the state presented in FIG. 7). In some embodiments, where the restoration is to FIG. 7, a manifest is read to determine that contents of row groups 1-4 are read and restored, while rows 5-11 are read based on the second manifest (e.g., from different files).

Figure 8:
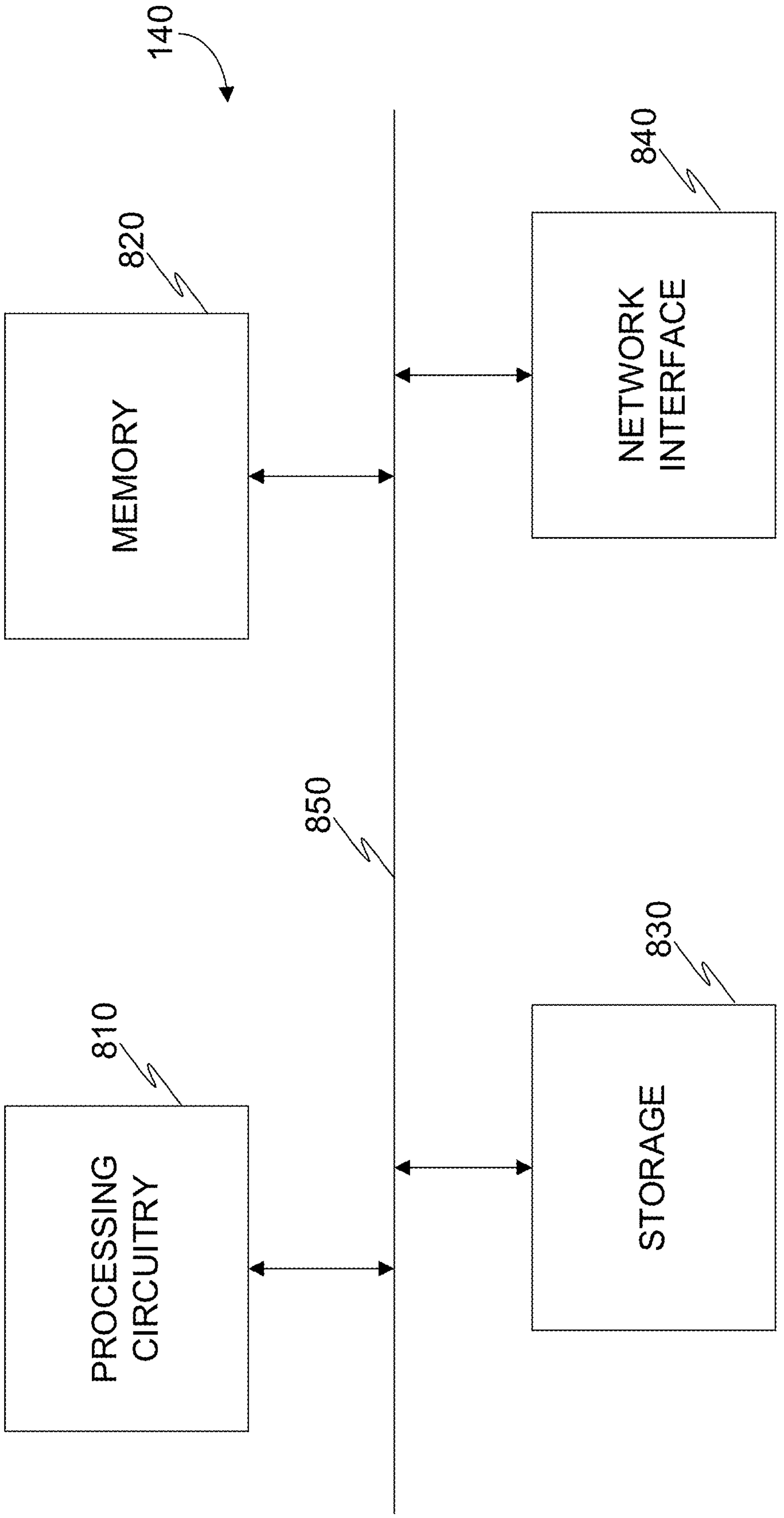
FIG. 8 is an example schematic diagram of a backup system according to an embodiment.

FIG. 8 is an example schematic diagram of a backup system 140 according to an embodiment. The backup system 140 includes, according to an embodiment, a processing circuitry 810 coupled to a memory 820, a storage 830, and a network interface 840. In an embodiment, the components of the backup system 140 are communicatively connected via a bus 850.

In certain embodiments, the processing circuitry 810 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 820 is a volatile memory (e.g., random access memory, etc.), a non-volatile memory (e.g., read-only memory, flash memory, etc.), a combination thereof, and the like. In some embodiments, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein is stored in the storage 830, in the memory 820, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 810, cause the processing circuitry 810 to perform the various processes described herein, in accordance with an embodiment.

In some embodiments, the storage 830 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 840 is configured to provide the backup system 140 with communication with, for example, the network 130, the workload 110, the restored workload 210, and the like, according to an embodiment.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method of reducing duplication in database backup generation, comprising:
- reading a plurality of rows of a database;
- generating a secondary hash value for each row of the plurality of rows;
- generating a rolling hash value based on a plurality of secondary hash values;
- generating a plurality of row groups, each including a group of unique rows of the plurality of rows, based at least on the secondary hash value and the rolling hash value;
- generating a primary hash value for each row group of the plurality of row groups;
- updating a backup of the database based on a first-row group of the plurality of row groups, in response to determining that a primary hash value of the first-row group does not match any primary hash value associated with the backup of the database.

2. The method of claim 1, further comprising:
- generating the backup of the database at a first time, the first backup including a plurality of primary hash values, each primary hash value generated based on content of at least a row of the database.

3. The method of claim 2, further comprising:
- storing a pointer to a location of the primary hash value and a primary key of the database; and
- associating the stored pointer and primary key with the backup.

4. The method of claim 2, further comprising:
- generating a manifest of the backup, the manifest including the plurality of primary hash values arranged in sequential order.

5. The method of claim 4, further comprising:
- generating a plurality of manifests, each manifest of the plurality of manifests corresponding to a unique backup of the database.

6. A non-transitory computer-readable medium storing a set of instructions for reducing duplication in database backup generation, the set of instructions comprising:

one or more instructions that, when executed by one or more processors of a device, cause the device to:

read a plurality of rows of a database;

generate a secondary hash value for each row of the plurality of rows;

generate a rolling hash value based on a plurality of secondary hash values;

generate a plurality of row groups, each including a group of unique rows of the plurality of rows, based at least on the secondary hash value and the rolling hash value;

generate a primary hash value for each row group of the plurality of row groups;

update a backup of the database based on a first-row group of the plurality of row groups, in response to determining that a primary hash value of the first-row group does not match any primary hash value associated with the backup of the database.

7. A backup system for reducing duplication in database backup generation comprising:

processing circuitry; and a memory containing instructions that, when executed by the processing circuitry, configure the backup system to:

read a plurality of rows of a database;

generate a secondary hash value for each row of the plurality of rows;

generate a rolling hash value based on a plurality of secondary hash values;

generate a plurality of row groups, each including a group of unique rows of the plurality of rows, based at least on the secondary hash value and the rolling hash value;

generate a primary hash value for each row group of the plurality of row groups;

update a backup of the database based on a first-row group of the plurality of row groups, in response to determining that a primary hash value of the first-row group does not match any primary hash value associated with the backup of the database.

8. The backup system of claim 7, wherein the instructions, when executed by the processing circuitry, further configure the backup system to:

generate the backup of the database at a first time, the first backup including a plurality of primary hash values, each primary hash value generated based on content of at least a row of the database.

9. The backup system of claim 8, wherein the instructions, when executed by the processing circuitry, further configure the backup system to:

store a pointer to a location of the primary hash value and a primary key of the database; and associate the stored pointer and primary key with the backup.

10. The backup system of claim 8, wherein the instructions, when executed by the processing circuitry, further configure the backup system to:

generate a manifest of the backup, the manifest including the plurality of primary hash values arranged in sequential order.

11. The backup system of claim 10, wherein the instructions, when executed by the processing circuitry, further configure the backup system to:

generate a plurality of manifests, each manifest of the plurality of manifests corresponding to a unique backup of the database.

* * * * *